United States Patent [19]

Bonier-Sahuc

[11] Patent Number: 5,018,906

[45] Date of Patent: May 28, 1991

[54] PULVERULENT PRODUCT STABILIZING SOILS IN PLACE AND METHOD OF APPLICATION

[76] Inventor: Monique F. Bonier-Sahuc, 5 rue Jobbé Duval, 75015 Paris, France

[21] Appl. No.: 269,310

[22] Filed: Nov. 10, 1988

[30] Foreign Application Priority Data

Nov. 13, 1987 [FR] France .................. 87 15722

[51] Int. Cl.$^5$ .............................................. E02D 3/12
[52] U.S. Cl. ................................. 405/263; 106/498; 106/900; 166/293
[58] Field of Search .................. 405/263; 166/293; 106/498

[56] References Cited

U.S. PATENT DOCUMENTS

| | | | |
|---|---|---|---|
| 4,163,657 | 8/1979 | Koslow et al. | |
| 4,424,076 | 1/1984 | Reed | 405/263 X |
| 4,442,241 | 4/1984 | Drake et al. | 166/293 X |
| 4,496,731 | 1/1985 | Spietschka et al. | 106/498 X |
| 4,610,306 | 9/1986 | Reese et al. | 166/293 |
| 4,659,259 | 4/1987 | Reed et al. | 405/263 |
| 4,676,317 | 6/1987 | Fry et al. | 166/293 |
| 4,693,639 | 9/1987 | Hollenbeak et al. | 166/293 X |

FOREIGN PATENT DOCUMENTS

| | | |
|---|---|---|
| 0072213 | 2/1983 | European Pat. Off. . |
| 1498915 | 9/1967 | France . |
| 1173022 | 12/1969 | United Kingdom . |
| 2117753 | 10/1983 | United Kingdom . |

*Primary Examiner*—Dennis L. Taylor
*Attorney, Agent, or Firm*—Burns, Doane, Swecker & Mathis

[57] ABSTRACT

The invention relates to the field of soil stabilization. It is aimed more precisely at a pulverulent product stabilizing soils in place, and its method of application. This product consists of the combination of a fatty amine such as distearyldimethylammonium chloride in powder form and of at least one pulverulent product chosen from cements, slaked limes, fly ash, water-repellents and their mixtures with compatible fillers and adjuvants.

10 Claims, No Drawings

PULVERULENT PRODUCT STABILIZING SOILS IN PLACE AND METHOD OF APPLICATION

The present invention relates to the field of soil stabilization. It is aimed more particularly at a pulverulent product stabilizing soils in place, especially on public roadway work sites, and at the method of application of the said stabilizer product.

A certain number of fillers have been used hitherto to stabilize subgrades intended to support highways and road decks; these fillers, particularly liquids, were mixed with various ponderous materials, the mix being applied in a number of spreading runs, which also required a number of compounding runs in the subsequent treatment of the subgrades. Furthermore, the use of liquid products in rainy weather was reflected in poor subgrade quality.

Among the documents of the prior art there may be mentioned FR-A-1,498,915, which relates to compositions for soil stabilization incorporating distearyldimethylammonium chloride as emulsifying agent. However, it is clearly indicated in the description that these compositions are applied in the form of an aqueous emulsion which is sprayed in the form of fine droplets; this document does not, therefore, disclose a stabilizing product applied in a pulverulent state and resulting from the combination of pulverulent materials. Furthermore, GB-A-2,117, 753 relates to compositions for various uses, particularly in the field of construction and/or insulating materials. These compositions contain cements and plasters and, when they are being prepared, require a sufficient quantity of water to ensure their setting; a soil-stabilizing product obtained from pulverulent materials and applied in the pulverulent state is therefore not involved. Moreover, this document neither describes nor suggests the use of the said compositions for soil stabilization.

An objective of the present invention is to provide a pulverulent stabilizer product enabling the mechanical strength of the soils pretreated in this manner to be increased to a very large degree.

Another objective of the present invention is to provide a pulverulent stabilizer product imparting frostresistance properties to the soil, together with an improvement in the waterproofing and sealing properties of the said soils.

A further objective of the invention is to provide a pulverulent product for stabilizing soils in place, eliminating, on the one hand, the swelling effects and, on the other hand, the fissuring effects.

Yet another objective of the present invention is to provide a pulverulent product for stabilizing soils, which makes it possible to reduce the handling of ponderous materials and whose rapid application enables it to be employed in a single spreading run and a single compounding run.

Still another objective of the invention is a product which can be employed for treating ground in order to make it waterproof, especially in the construction of ponds and water dams.

The subject of the present invention is therefore a pulverulent product for stabilizing soils in place, which consists of the combination of a pulverulent fatty amine such as pulverulent distearyldimethylammonium chloride and at least one pulverulent product chosen from cements, slaked limes, fly ash, water repellents and mixtures thereof with compatible fillers or adjuvants.

According to a particular formulation of the pulverulent product for stabilizing soils of the invention, use is made of a mixture consisting of 1 to 6% by weight, preferably 4%, of pulverulent distearyldimethylammonium chloride and of 94 to 99% by weight, preferably 96%, of cement. In the case of a cement with a mean particle diameter of the order of 0.4 to 1 $\mu$, a distearyldimethylammonium chloride with a mean particle diameter of the order of 0.1 mm to 0.7 mm is advantageously employed. The pulverulent product for stabilizing soils of the invention may also contain minor quantities of amine products chosen from quaternary amine chlorides, free amine chlorides and mixtures thereof, in proportions which are compatible with its utilization.

The water repellants will be preferably chosen from linear polymers comprising alcohol, acid or amide units in the monomer unit, for example poly(vinyl alcohol), poly(acrylic or methacrylic acid), polyacrylamide, polyacrylonitriles and polyamides containing a relatively high proportion of methylene groups and mixtures thereof.

The present invention also extends to a method of application of the pulverulent product for stabilizing soils in place, wherein from 1 to 6 % by volume of the stabilizer product is applied per $m^3$ of earth, which, depending on the soils, corresponds to an application of 5 to 40 kg of stabilizer product per $m^2$ of earth over a thickness of 10 to 40 cm, for example of 20 to 30 cm.

Other advantages and features of the present invention will become apparent on reading the following description of examples of application of the pulverulent product for stabilizing soils according to the present invention, no limitation being implied. In Examples 1 to 9 the pulverulent product for stabilizing soils means the mixture consisting, by weight, of 4 % of distearyldimethylammonium chloride to 96% of cement. All the measurements and all the results in question have been obtained according to the usual methods recommended by the Central Laboratory for Bridges and Highways (France). Code of Practice of Dec. 20, 1972, circular 72–213 Ministry of Town and Country Planning, of Equipment, of Housing and of Tourism. Bearing capacity tests are carried out using the Dynapak apparatus.

EXAMPLE 1

To produce a subgrade of 6000 $m^2$ intended to support a heavy roadway classified as type T2 according to the standards of SETRA (Department of Studies, Road Transportation and Motor Vehicles) relating to highway structures, Highways Guide 1977, the soil is treated by compounding 1.5 % by volume of stabilizer product per $m^3$, which corresponds, in this case, to 6 kg per square meter over a depth of 25 cm. After a period of application of two days, an ease of handling, reduction in dust and absence of sinking into the pulverulent product once it has been spread are noted, while the operations can be carried out in a single spreading run and a single compounding run, which is reflected in a time saving of approximately two days relative to a work site employing conventional products. It was noted, on this site, that two months after the work it was impossible to cut into the improved subgrade in order to dig trenches therein. Plate tests which were carried out have shown that the mean bearing capacity of the subgrade as expressed as a Westergaard modulus, is K 123.0 in $MN/m^3$, while the EV2 modulus was 69.2 MPa. A penetrometer test up to 15 MPa was carried out after 5 days' treatment.

EXAMPLE 2

An under-slabbing made of concrete was produced over 1100 m$^2$ on ground of the dark brown silt type with a maximum dry density of 1.77, using 1.5% of the stabilizer product of the invention per m$^3$ of silt, that is to say 6 kg per m$^2$ over a thickness of 25 cm. The same observations as in Example 1 were made on the site. Samples of water contents using a gamma-densitometer 11 days after the application showed an average water content of 20.4 % at an average density of 1.51.

Tests averaging 10.7 MPa were carried out with a penetrometer three weeks after the application, which is highly satisfactory.

EXAMPLE 3

A 17,000 m$^2$ base course was produced under 7 cm$^2$ of wet mix for a lightweight traffic road deck. To do this, 1.5% of stabilizer product of the invention was employed per m$^3$, that is to say, in this case, 6 kg per m$^2$ over a thickness of 25 cm. The operation took 2 days, and, because of the low proportion applied, after the earth treated in this manner was mixed with lime, the roller passed over once to spread the stabilizer product over the flat soil, thus promoting the homogeneity and the uniformity of the treatment. A comparison was made by producing a part of the road deck with 6 % of cement per m$^3$ instead of 1.5 % per m$^3$ of stabilizer product, as specified above. It was impossible to detect any difference between the area treated with 6% of cement and the area treated with 1.5 % of the stabilizer product of the invention. 8 days after the treatment, a penetrometer test gave the value of 25 MPa.

EXAMPLE 4

The stabilizer product of the invention was employed on site intended to stabilize a lightweight road of 4000 m$^2$ surfaced with chippings and a wet mix of 4 cm.

The soil consisted of a silt with an optimum water content of 16.3 % and a maximum dry density of 1.78. The stabilizer product of the invention was applied in a proportion of 1.5 % per m$^3$, that is, in this case, 6 kg per m$^2$ over a thickness of 25 cm. After an application time of one day, easy handling was observed, reflected in a time saving due also to the small quantity incorporated in the soil. Penetrometer tests carried out 2 days afterwards gave the following results:

test average:
at 3 cm 14.5 MPa
at 6 cm 15.4 MPa
at 9 cm 17.2 MPa
at 12 cm 16.2 MPa
at 15 cm 19.8 MPa
at 18 cm 22.9 MPa
at 21 cm 17.8 MPa
at 24 cm 12.6 MPa

EXAMPLE 5

To produce a subgrade in a tunnel intended for installing a walkway for pedestrians, made of stabilized hard soil, the stabilizer product of the invention was employed in a proportion of 2% per m$^3$ of a mix of very clayey, silty soil and of a sandy soil in a proportion of 50:50, that is, in this case, 10 kg per m$^2$ over a thickness of 30 cm. The mixing was performed off-site and the product was transported by trucks to the channel. The installation of a block 16×3×0.3 meters was carried out in three 0.1 meter courses with two roller runs over the first two courses, the third being specially finished to avoid any roller mark. It should be noted that, in an application of this kind, the work must be done relatively quickly during the rolling, to avoid repeat runs over the edges of the track, since the soil quickly becomes very hard, while an obvious hardening was ascertained the following day. A test by means of a repeated running of a vehicle loaded with gravel over a part of the test block showed no change in the soil surface.

EXAMPLE 6

To stabilize a subgrade over 5,800 m$^2$, intended to support a heavy type $T_2$ roadway, the stabilizer product of the invention was employed in a proportion of 1.5% per m$^3$, which corresponds to 6 kg per m$^2$ over a thickness of 25 cm. A lime treatment in a proportion of 2% per m$^3$ was also carried out, the water content of the soil at the time of the work on site being 16%. After a period of application of 1.5 days, plate tests showed that the average bearing capacity is K 126 in MN/m$^3$.

EXAMPLE 7

To stabilize a lightweight track and a number of small parking areas surfaced with chippings and a wet mix of 4 cm, over a total surface area of 10,000 m$^2$, the dry stabilizer product of the invention was employed in a proportion of 1.5% per m$^3$, that is 6 kg per m$^2$ over a thickness of 25 cm, the application time being 2 days. Plate tests showed that the average bearing capacity is K 90 in MN/m$^3$.

EXAMPLE 8

In order to stabilize a foundation course over 2000 m$^2$ for a parking area (base course: 8 cm bitumen sand-gravel mixture+6 cm of wet mix), a traverse with quicklime in a proportion of 2% over a thickness of 30 cm was carried out, followed by a run with dry stabilizer product of the invention at 1.5 % over a thickness of 25 cm during an application time of half a day. The Dynapak bearing capacity showed a restitution coefficient (R) at approximately 7 days of 0.65 v. 0.63 required, and a mean dynamic modulus (E) value of 92 MPa.

EXAMPLE 9

To stabilize a 5500 m$^2$ parking area for lightweight vehicles lined with a 7 cm wet mix, a run with 3% quicklime was carried out over a thickness of 30 cm, followed with a run with dry stabilizer product of the invention at a strength of 1.5% over a depth of 25 cm, that is 6 kg/m$^2$. The application took six hours.

The tests carried out showed a mean modulus (EV$_2$) of 133.1 MPa at 7 days. The ratio of moduli EV$_2$/EV$_1$ was greater than 1.68.

EXAMPLE 10

Results equivalent to those of Example 1 were obtained on raising a very heavy roadway by 30 cm with a quarry material stabilized by means of the stabilizer product consisting, on a weight basis, of 2% of pulverulent dimethyldistearylammonium and of 98% of cement.

EXAMPLE 11

By virtue of the properties of sealing soils and of making earth water-repellent, the stabilizer products according to the invention are employed for treating the ground on sites intended for the construction of waterretention basins, canals and other pond works. The permeability obtained on clayey silts is of the order of $10^{-9}$ cm/s.

Thus, the stabilizer product of the invention makes it possible to effect stabilization of the soils in place in the case of all highway constructions in the form of subgrade, foundation course and base course, heavy tracks, lightweight tracks, the waterproofing and sealing of water-retention basins, stabilization of slopes and other stabilization works concerning soils, this being by virtue of the composition of the said product obtained from a judicious mixture of distearyldimethylammonium chloride and of a single or composite pulverulent product suited to the utilization.

I claim:

1. Pulverulent product for stabilizing soils in place comprising a pulverulent fatty amine and at least one pulverulent product chosen from cements, slaked limes, fly ash, water repellents and mixtures thereof.

2. Pulverulent stabilizer product according to claim 1 comprising 1 to 6% by weight of pulverulent distearyldimethylammonium chloride and of 94 to 99% by weight of cements.

3. Pulverulent stabilizer product according to claim 1 wherein the pulverulent water repellents are linear polymers comprising alcohol, acid or amide units in the monomer unit, and mixtures thereof.

4. Pulverulent stabilizer product according to claim 1 which the distearyldimethylammonium chloride has a mean particle diameter of the order of 0.1 mm to 0.7 mm, while the cement has a mean particle diameter of 0.4 $\mu$ to 1 $\mu$.

5. Pulverulent stabilizer product according to any one of claims 1 to 4 further comprising, in a minor quantity, amine products chosen from quaternary amine chlorides, free amine chlorides and mixtures thereof.

6. The pulverulent stabilizer product according to claim 1 wherein said fatty amine is distearyldimethylammonium chloride.

7. The pulverulent stabilizer product according to claim 2 comprising 4% by weight of pulverulent distearyldimethylammonium chloride and 96% of cements.

8. The pulverulent stabilizer product according to claim 3 wherein the water repellents are poly(vinyl alcohol), poly(acrylic or methacrylic acid), polyacrylamide, polyacrylonitriles or polyamides containing a relatively high proportion of methylene groups.

9. A treated soil comprising a soil base and, applied above said soil base, from 1 to 6% by volume of the product of claim 1 per m$^3$ of earth forming part of the soil, which results in an application of 5 to 40 kg of stabilizer product per m$^2$ of soil over a thickness of 10 to 40 cm.

10. The pulverulent stabilizer product according to claim 1 wherein said pulverulent product further includes compatible fillers or adjuvants.

* * * * *